US011749085B2

(12) United States Patent
De Haes et al.

(10) Patent No.: US 11,749,085 B2
(45) Date of Patent: Sep. 5, 2023

(54) ELDERLY CARE AND SECURITY SYSTEM

(71) Applicant: NOBI BV, Antwerp (BE)

(72) Inventors: Bert Hendrik De Haes, Boechout (BE); Roeland Pelgrims, Antwerp (BE); Stijn Verrept, Temse (BE)

(73) Assignee: NOBI BV, Antwerp (BE)

( * ) Notice: Subject to any disclaimer, the term of this patent is extended or adjusted under 35 U.S.C. 154(b) by 131 days.

(21) Appl. No.: 17/594,023

(22) PCT Filed: Feb. 18, 2020

(86) PCT No.: PCT/EP2020/054185
§ 371 (c)(1),
(2) Date: Sep. 30, 2021

(87) PCT Pub. No.: WO2020/207649
PCT Pub. Date: Oct. 15, 2020

(65) Prior Publication Data
US 2022/0165144 A1  May 26, 2022

(30) Foreign Application Priority Data

Apr. 11, 2019 (EP) .................................... 19168787

(51) Int. Cl.
*G08B 21/04* (2006.01)
*G08B 7/06* (2006.01)
(Continued)

(52) U.S. Cl.
CPC ............. *G08B 21/043* (2013.01); *G08B 7/06* (2013.01); *G08B 13/04* (2013.01); *G08B 17/103* (2013.01); *G08B 21/0453* (2013.01)

(58) Field of Classification Search
CPC .................................................. G08B 21/043
See application file for complete search history.

(56) References Cited

U.S. PATENT DOCUMENTS 8,638,228 B2 * 1/2014 Amigo ................. A61B 5/6804
73/488
10,380,875 B1 * 8/2019 Roberts ..................... G08B 7/06
(Continued)

FOREIGN PATENT DOCUMENTS

CN    103517042 A    1/2014
CN    104048275 A    9/2014
(Continued)

OTHER PUBLICATIONS

International Search Report and Written Opinion from PCT Application No. PCT/EP2020/054185, dated Oct. 30, 2020.
(Continued)

*Primary Examiner* — Travis R Runnings
(74) *Attorney, Agent, or Firm* — Workman Nydegger

(57) ABSTRACT

An elderly care and security system comprises one or more networked lighting luminaire installed in a room, the luminaire comprising: one or more sensors configured to: detect a fall; detect smoke; detect glass break; detect presence of another person in the room while the elderly person is lying in bed; and detect presence of a person while an alarm system is active and detect no presence for a period longer than a predetermined time interval; a lighting unit controlled to adaptively illuminate the room; a wireless bi-directional transceiver, loudspeaker and microphone, configured to be activated automatically for communication with the elderly person, a caregiver or relative; a door locking/unlocking unit with connectivity to an electrical door lock, configured to automatically lock/unlock a door of a safe room for the elderly person; and an alarm activating unit, configured to automatically activate/deactivate an alarm.

14 Claims, 1 Drawing Sheet

(51) Int. Cl.
*G08B 13/04* (2006.01)
*G08B 17/103* (2006.01)

(56) References Cited

U.S. PATENT DOCUMENTS

| | | | |
|---|---|---|---|
| 10,529,200 B2 | 1/2020 | Toulemonde et al. | |
| 2005/0185398 A1 | 8/2005 | Scannell, Jr. | |
| 2006/0017560 A1 | 1/2006 | Albert | |
| 2007/0229286 A1* | 10/2007 | Huang | G08B 21/0446 340/686.1 |
| 2008/0084296 A1* | 4/2008 | Kutzik | G08B 21/0453 340/540 |
| 2010/0271802 A1 | 10/2010 | Recker et al. | |
| 2014/0155729 A1 | 6/2014 | Saitoh | |
| 2015/0379851 A1 | 12/2015 | Diels | |
| 2017/0219234 A1 | 8/2017 | Bhide | |
| 2018/0253954 A1* | 9/2018 | Verma | G08B 25/08 |
| 2018/0342329 A1 | 11/2018 | Rufo et al. | |
| 2019/0147721 A1* | 5/2019 | Avitan | G06F 1/3209 340/573.1 |
| 2019/0236918 A1 | 8/2019 | Toulemonde et al. | |
| 2021/0150872 A1* | 5/2021 | Ten Kate | G08B 29/188 |
| 2021/0365674 A1* | 11/2021 | Veretennikov | H04N 7/18 |
| 2022/0270453 A1* | 8/2022 | Werner | G08B 13/04 |
| 2023/0018686 A1* | 1/2023 | Shin | G01S 13/88 |

FOREIGN PATENT DOCUMENTS

| | | |
|---|---|---|
| CN | 207115700 U | 3/2018 |
| CN | 108538035 A | 9/2018 |
| CN | 108709152 A | 10/2018 |
| JP | 2002100484 A | 4/2002 |
| KR | 101385211 B1 | 4/2014 |
| WO | 2015191722 A1 | 12/2015 |
| WO | 2017220926 A1 | 12/2017 |

OTHER PUBLICATIONS

Extended Search Report from corresponding EP Application No. 19168787.0, dated Oct. 24, 2019.

* cited by examiner

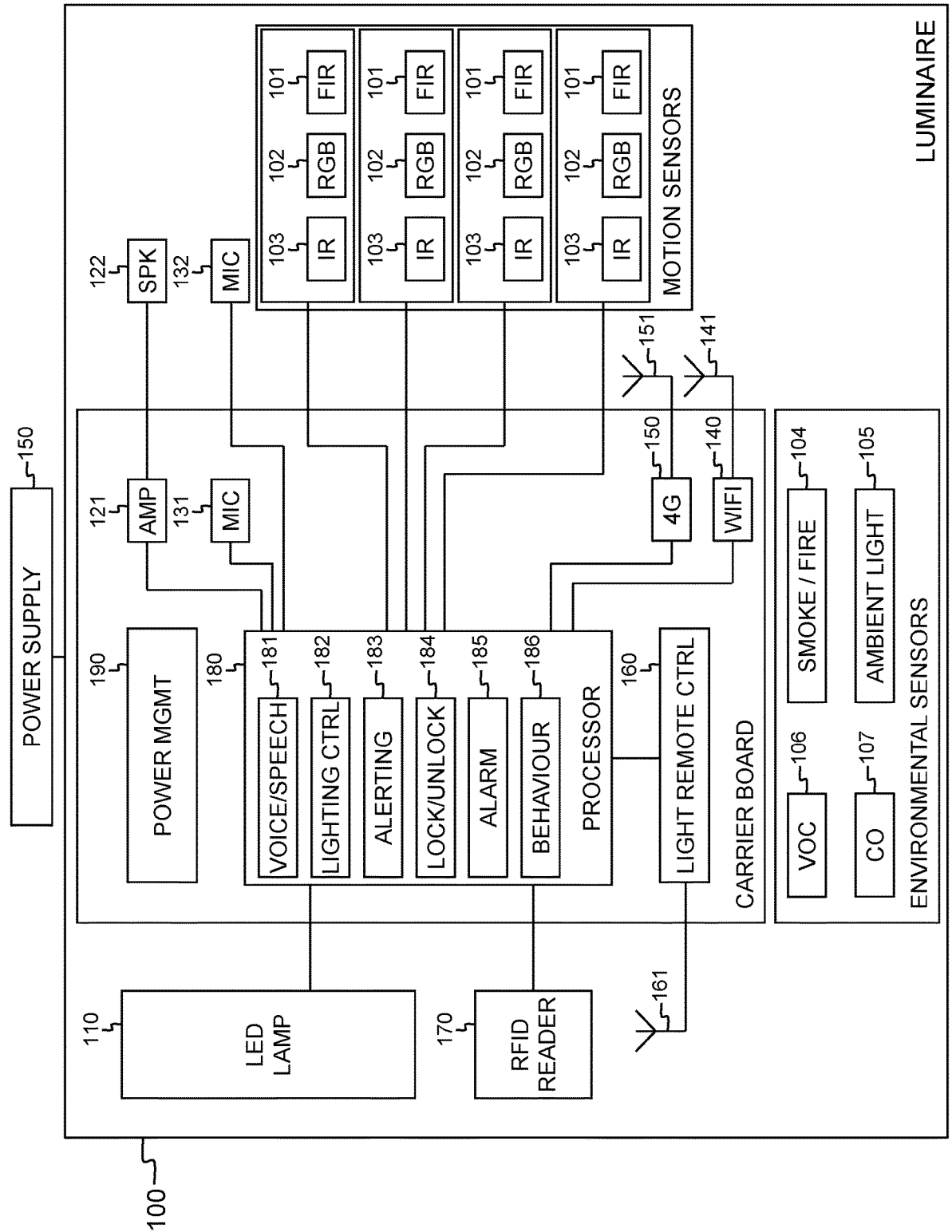

ELDERLY CARE AND SECURITY SYSTEM

FIELD OF THE INVENTION

The present invention generally relates to elderly care for an elderly person at home, being a private house, service flat or a room in a care institution where the elderly person resides. The present invention more particularly aims at improving the safety and security of elderly persons without patronizing or intruding their privacy.

BACKGROUND OF THE INVENTION

Elderly people prefer to live at their own house or in a service flat as long as possible to enjoy the autonomy and privacy of such house or flat as well as the environment the elderly person is used to, for instance the neighbourhood where the elderly person has been living for many years. Caregivers and relatives of an elderly person, like for instance friends or family, on the other hand desire to be informed as quickly as possible in case of a fall or other medical problem with the elderly person without patronizing or intruding the privacy of the elderly person. Another worry of elderly people and their relatives or caregivers is the security of the house, flat or room wherein the elderly person lives. The elderly person must be safe in case of smoke, fire, glass break, burglary, etc.

Various solutions exist for monitoring elderly persons, often based on cameras installed in the elderly person's house or flat, or based on wearables to be worn by the elderly person. Cameras in an elderly person's house, flat or room are felt to be privacy intrusive. Wearables on the other hand can be removed by the elderly person. In particular elderly persons suffering from dementia tend to remove unfamiliar devices or simply forget to wear them. Obliging an elderly person to permanently wear a monitoring device also feels patronizing and privacy intrusive.

Fall detection systems based on 3D sensors like time-of-flight (TOF) cameras and/or infrared (IR) sensors are known. The best performing fall detection system known relies on a combination of IR based 3D thermography sensors and TOF distance sensors and is described in United States Patent Application US2015/0379851A1 entitled "Dual Sensor System and Related data Manipulation Methods and Uses". The IR based thermography sensors and TOF sensors however are used solely to detect a fall of an elderly person.

Chinese Utility Model CN207115700U entitled "Lamp and Alarm System" describes a luminaire with LEDs, fall detector, and Bluetooth module for elderly rooms. The fall detector uses a radar sensor that senses the distance to objects and detects a fall of an elderly person based on distance changes. The Bluetooth module establishes communication with a server that possible further generates alarms sent over 3G/4G networks to caregivers.

In CN207115700U there is no interaction between the fall detection technology and the lamp function (LEDs). There is no suggestion to detect other medical abnormalities like for instance a restless state, and the luminaire provides no security/safety functions.

Chinese Patent Application CN104048275A entitled "Elderly People Living Alone-Oriented Intelligent Lighting and Alarm System" describes a system for elderly monitoring that comprises an array of IR sensors to monitor the path of the elderly through temperature sensing, an ambient light sensor, and a controller to control the lighting in the elderly room in view of the sensed path and the sensed ambient light, and to activate an alarm when the elderly person has fallen.

In CN104048275A, the array of IR sensors is installed in front of the elderly person's bed. There is no integration of the fall detection technology in a lamp or luminaire. The controller in other words connects with existing lighting in the room, as a consequence of which the installation complexity remains high. The system known from CN104048275A further lacks security/safety increasing functionality for the elderly person.

To enhance the security of homes, various solutions exist like for instance smoke detectors, alarm systems with motion sensors, infrared sensors and/or door/window contact sensors, etc.

Japanese patent application JP2002100484A2 entitled "Illumination and/or Disaster Prevention Control Device" describes a luminaire for elderly people that detects abnormalities like a fall, detects the presence of illegal intrusion (burglary), detects fire/smoke. The luminaire is able to adapt light in view of a sensor output, and further has an integrated speaker and communications module able to automatically setup a communication.

The luminaire known from JP2002100484A2 does not detect glass break and does not create a safe room for the elderly person in case of illegal intrusion. JP2002100484A2 also does not specify or suggest the use of specific sensors.

Korean patent application KR101385211B1 entitled "Integrated Safety Guard System of Smart Type" describes a security system for elderly people that contains a fire sensor, and further detects human presence and abnormalities. The system is equipped with a speaker/microphone, a wireless transceiver and connectivity to power lines for powerline communication.

The security system known from KR101385211B1 is complex to install as it is not designed to replace an existing, powered device. The system known from KR101385211B1 further does not detect a fall and does not create a safe room for the elderly person in case of illegal intrusion. It also does not control the lighting in the elderly person's house, flat or room to automatically create a safe and secure environment for the elderly person.

United States patent application US2014/155729A1 entitled "Device for Sensing Human Body Abnormality by Standing-Wave Radar and Method for Using Same" describes a care luminaire that is installed in place of a regular lamp. The care luminaire comprises radar technology to detect the position, heartrate and respiratory rate of a person. A speaker and wireless transceiver are provided to generate an alarm. Consequently, a fall can be detected and reported.

The care luminaire of US2014/155729A1 does not increase the security of the elderly person in case of smoke, fire, glass break, unwanted person detection, etc. Consequently, no safe room is created for the elderly person in any of these unsafe circumstances.

United States patent application US2005/0185398A1 entitled "Multifunction-Adaptable, Multicomponent Devices" describes a luminaire with extensive integrated functionality like medical/health monitoring, wireless/wired communication, surveillance/security, smoke filtering, air freshening/purifying, etc.

The luminaire of US2005/0185398A1 does not detect a fall based on and does not create a safe room for a person in case of illegal intrusion.

Existing security enhancing systems generally are complex to install, configure and maintain. Often, technology deployed for monitoring an elderly person (i.e. safety or care systems) and technology deployed for monitoring the home (i.e. security systems) are redundant. These systems require separate power wiring, separate signalling networks, separate installation and maintenance, increasing the cost and complexity and preventing these systems from offering integrated value to the elderly person, his relatives and caregivers. As a consequence, there is a general need for systems that improve the care, safety and security of elderly persons that are non-privacy intrusive and less complex in installation, configuration and maintenance, while offering integrated functionality to the elderly person, his relatives and caregivers.

SUMMARY OF THE INVENTION

According to the invention, one or more shortcomings of the existing solutions are resolved and the above identified objective is achieved through the elderly care and security system defined by claim 1, comprising one or more networked lighting luminaire, the lighting luminaire being designed to be mounted in a room of an elderly person's home at a spot on a ceiling or wall where electric power is available, the lighting luminaire comprising:

A. one or more sensors configured to:
  A1. reliably detect a fall of the elderly person and to generate first signalling in return to detection of the fall;
  A2. detect smoke in the room and to generate second signalling in return to detection of the smoke;
  A3. detect glass break in the room and to generate third signalling in return to detection of the glass break; and
  A4. detect presence of another person in the room while the elderly person is lying in bed, and to generate fourth signalling in return to detection of the presence of another person while the elderly person is lying in bed; and
  A5. detect presence of a person while an alarm system is active after detecting no presence for a period longer than a predetermined time interval, and to generate fifth signalling in return to detection of the presence of a person while said alarm system is active;
B. a lighting unit controlled to adaptively illuminate the room based on the first, second, third, fourth or fifth signalling;
C. a wireless bi-directional transceiver, loudspeaker and microphone, configured to be activated automatically for voice communication with the elderly person, a caregiver or relative of the elderly person in return to the first, fourth or fifth signaling;
D. a door locking/unlocking unit with connectivity to an electrical door lock, the door locking/unlocking unit being configured to automatically unlock a door in return to the second signalling and to automatically lock a door of a safe room for the elderly person in return to the third signalling and/or the fourth signalling; and
E. an alarm activating unit with connectivity to the alarm system, the alarm activating unit being configured to automatically activate the alarm system after detecting no presence for a period longer than said predetermined time interval, and to automatically deactivate the alarm system in return to the fifth signalling and valid identification of the person.

Thus, the invention resides in the integration of non-privacy intrusive technology that is desired to be present in the home of an elderly person to provide both safety/security functions and care functions through a single apparatus that requires only electric power to be available and that feels familiar to the elderly person: a care and security luminaire that can replace any lamp or lighting fixture currently installed in the elderly person's home. The care and security luminaire according to the invention at least comprises sensors that can detect a fall, detect the presence of smoke or fire, detect glass break and detect the presence or absence of humans in the room where it is installed. Preferably, plural care and security luminaires are installed in different rooms of the elderly person's home, the luminaires being network connected with each other, either wirelessly or via the available power wiring. The care and security luminaire at least also generates different signalling in return to detection of a fall, detection of smoke/fire, detection of glass break, detection of presence of another person in the elderly person's home while the elderly person is asleep in bed and detection of a person while the alarm system is activated after detecting no presence for a certain time period, such that lighting in the room can be adapted to these circumstances, whichever has been detected. The care and security luminaire is equipped with a loudspeaker, microphone and wireless transceiver that are interconnected and configured to be activated automatically upon detection of a fall in such manner that the fallen elderly person can bidirectionally communicate with a caregiver or relative. The care and security luminaire further comprises a unit that remotely locks or unlocks a door such that a safe illuminated exit can be guaranteed for the elderly person in case of fire/smoke, and a locked safe room can be guaranteed for the elderly person in case of glass break or illegal intrusion by humans in the elderly person's home. In case intrusion of another person is detected while the elderly person is lying in bed, the loudspeaker may be activated to request identification, and the microphone may be activated together with voice recognition to enable the person entering the house of the elderly person to identify himself/herself or to spell a secret code to avoid that relatives or caregivers are alarmed. Further, the care and security luminaire is equipped with an alarm activating unit that is configured to automatically activate alarm monitoring of the elderly person's home as soon as it is detected that the elderly person is absent from his home or room for a certain period of time. In the latter case, it is assumed that the elderly person has gone out without activating his alarm. The care and security luminaire shall automatically activate the alarm monitoring to prevent illegal intrusion or burglary while the elderly person is absent or at least generate an alarm in case of illegal intrusion or burglary while the elderly person is absent. Upon detection of a person while the alarm system is active, the microphone may be activated together with voice recognition to enable the person entering the house of the elderly person to identify himself/herself or to spell a secret code. In case of valid identification or a valid secret code, the care and security luminaire will generate signalling allowing the alarm system to become deactivated. As the care and security luminaire requires only electric power to be available, installation complexity is reduced to replacing an existing lamp or lighting fixture by the care and security luminaire according to the invention. The connection to an electrical door lock may be realized through wireless communications such as for instance Bluetooth, WiFi, etc. The connection to an existing electrical lock may be configured on-site by the installer of the care and security luminaire. Alternatively, an existing lock is replaced with a new electrical lock that is configured to connect with the care and security luminaire. The care and security luminaire preferably is designed as a lighting fixture that feels familiar to the elderly person, further enhancing acceptance by the elderly person and the persuasion that the device is not patronizing or privacy intruding for the elderly person.

In embodiments of the elderly care and security system defined by claim 2, the one or more sensor comprise at least one of:
- a thermography sensor;
- a time-of-flight sensor;
- an RGB sensor;
- a 3D RGB sensor;
- a smoke chamber;
- an infrared sensor;
- a radar; and/or
- a lidar.

The care and security luminaire according to the invention at least must comprise sensors that can detect a fall. Various types of sensors, either alone or in combination, can serve this purpose. The skilled person consequently will appreciate that the present invention is not restricted to the use of a particular type of sensor. The above list of example sensors is therefore non-exhaustive. A preferred embodiment of the care and security luminaire according to the invention is equipped with thermography sensors and time-of-flight sensors, abbreviated TOF sensors, and a smoke chamber. The thermography and TOF sensors can be configured to reliably detect a fall and consequently generate reliable first signalling when such fall is detected. The smoke chamber present in such preferred embodiment is further configured to detect smoke/fire and generates reliable second signalling warning for smoke/fire in the room where the care and security luminaire is installed. Glass break is preferably detected through sound. The breaking of glass results in specific frequencies being present in the sound captured by the microphone. Detection of these frequencies in other words enables to generate third signalling that may be used to automatically warn a relative or caregiver of the elderly person, possibly after the elderly person has been given the chance to confirm he is safe via voice recognition and/or spelling a secret code. The thermography and TOF sensors in addition are configured to detect movement of humans in the room or—in case plural networked luminaires are installed—in the house of the elderly person. This enables the care and security system according to the invention to detect burglary or unwanted intrusion by humans in the elderly person's house while the elderly person is lying asleep on his bed, and to generate reliable fourth signalling that is used to control one or plural door locks in the house in order to create a safe room for the elderly person, and/or to activate the loudspeaker and microphone in order to enable the person entering the room to identify himself/herself through voice recognition or a secure code that must be pronounced by the person. The thermography and TOF sensors also allow to detect presence of a person while the alarm system is activated, for instance automatically activated after detection of absence for a certain time interval, and consequently enable to generate fifth signalling that is used to automatically activate the loudspeaker and microphone enabling the person to identify himself or spell a secret code, and to automatically deactivate an alarm (deactivate monitoring the room) in case of valid identification or a valid secret code.

Embodiments of the elderly care and security system defined by claim 3, further comprise:
- a processor whereto the one or more sensor are coupled, the processor being configured to detect an event based at least on the first, second, third, fourth and/or fifth signalling, and further being configured to control the lighting unit to adapt the colour of emitted light in view of the event.

Thus, the light emitted by the luminaire may be adapted to signal an event triggering action from the elderly person. In case a high $CO_2$ concentration is detected in the room, the emitted light may be green to indicate to the elderly person that the room preferably is ventilated by opening a window. In case the elderly person has to take medication, the light emitted by the luminaire may turn blue to indicate it is time for the elderly person to take medication. When it is detected that the elderly person is sitting on his bed at night, the luminaire may be controlled to provide less intense light, preferably with increased red colour component, as a measure for fall prevention and orientation assistance. The intensity of the light may gradually increase when the elderly person is leaving his bed. The room may be illuminated with different light intensities or different colours in any of the other detectable events, i.e. a fall, smoke/fire, glass break or illegal intrusion of humans. As an alternative to varying the light colour or intensity, or in combination with varying the light colour or intensity, the care and security luminaire may activate the loudspeaker and microphone and use voice feedback to let the elderly person know his room must be ventilated, medication must be taken, etc.

In embodiments of the elderly care and security system according to the invention, as defined by claim 4, the lighting unit is controlled to generate biorhythmic light.

Indeed, preferred embodiments of the care and security luminaire illuminate the room of the elderly person with an intensity that is automatically adapted to the available daylight and white balance (expressed in Kelvin) adjusted to the circadian rhythm. The biorhythm may be pre-programmed or may be sensed through a light intensity sensor or ambient light sensor available in the care and security luminaire.

Embodiments of the elderly care and security system according to the invention, as defined by claim 5, further comprise a neural network configured to learn a behavioural pattern of the elderly person, the wireless bi-directional transceiver further being configured to automatically send a message to a caregiver or relative of the elderly person in return to detection of behaviour of the elderly person that deviates for more than a predetermined level from the behavioural pattern.

Indeed, advantageous embodiments of the care and security luminaire are equipped with a neural network that learns behavioural patterns of the elderly person. Behavioural patterns could for instance encompass movements of the elderly person, positions of the elderly person (for example when sitting in the sofa, when lying in bed, when standing up, when walking, etc.), a sequence of movements, timing during the day of movements, speed of movements, etc. As soon as the elderly person's behavioural pattern deviates from the learned behavioural pattern by a predetermined measurable amount (for example the speed to go from a stand-up position to a sitting position exceeds the learned average speed by 20 percent), the wireless transceiver, in the care and security luminaire is activated to send a message to a relative or caregiver of the elderly person, mentioning the detected anomaly.

In embodiments of the elderly care and security system according to the invention, as defined by claim 6, the lighting luminaire further comprises one or more environmental sensors.

Thus, advantageous embodiments of the care and security luminaire may comprise additional sensors, like for instance air quality sensors, enabling the care and security luminaire to be configured such that the loudspeaker generates an audible alarm in case the air quality in the room of the elderly person drops below a certain threshold, and/or such that the lighting unit generates a visible alarm in case the air quality in the room of the elderly person drops below a certain threshold, and/or the wireless transceiver transmits an alarm message to a relative or caregiver of the elderly person in case the air quality in the room of the elderly person drops below a certain threshold. This way, the care and security luminaire further contributes to the safety and security of the elderly person without intruding the privacy of the elderly person.

In embodiments of the elderly care and security system according to the invention, as defined by claim 7, the one or more environmental sensors comprise:
  a humidity sensor;
  a CO2 sensor;
  a VOC sensor;
  a CO sensor.

Indeed, the output of a humidity sensor may be used to generate alarms as described above when the humidity exceeds a certain threshold and the elderly person is at risk of abnormal breathing. Similarly, the output of a CO2 sensor may be used to generate alarms as described above when the CO2 concentration exceeds a certain threshold, triggering the elderly person to open a window or vent the room. The output of a CO sensor or VOC (Volatile Organic Compounds) sensor may be used to generate alarms when the CO concentration or the concentration of another toxic compound exceeds a certain threshold, for example as a consequence of malfunctioning of the heating, and the elderly person is at risk of CO intoxication. Detection of a high CO concentration is critical and very urgent. The generated alarm in this case will urge the elderly person to leave the room. The skilled person will appreciate that other sensors integrated in embodiments of the care and security luminaire according to the invention may contribute to monitoring the air quality in the room of the elderly person, allowing the trigger alarms whenever the elderly person's health is at risk.

In embodiments of the elderly care and security system according to the invention, as defined by claim 8, the lighting luminaire further comprises one or more medical sensor.

Thus, advantageous embodiments of the care and security luminaire may comprise additional sensors, like for instance medical sensors, enabling the care and security luminaire to be configured such that the wireless transceiver transmits an alarm message to a relative or caregiver of the elderly person in case of a possible problem with the medical condition of the elderly person. This way, the care and security luminaire further contributes to the safety and security of the elderly person without intruding the privacy of the elderly person.

In embodiments of the elderly care and security system according to the invention, as defined by claim 9, the one or more medical sensor comprise:
  a blood pressure sensor;
  a heartrate sensor;
  a breath rate sensor.

This way, the care and security luminaire may monitor the blood pressure of the elderly person and send an alarm signal to a relative or caregiver when the blood pressure drops below a certain threshold or exceeds a second threshold. The care and security luminaire also may monitor the heartrate of the elderly person and send an alarm signal to a relative or caregiver when the heartrate drops below a certain first threshold or exceeds a certain second threshold. The care and security alternatively or in addition thereto may monitor the breath rate of the elderly person and send an alarm signal to a relative or caregiver when the breath rate drops below a certain first threshold or exceeds a certain second threshold. Monitoring the breath rate may also enable to establish when the elderly person is restless, for instance while asleep, and allow to control the lighting in the room of the elderly person with restful light patterns allowing the elderly person to reduce his breath rate. The care and security luminaire alternatively or additionally may monitor the body temperature of the elderly person and send an alarm signal to a relative or caregiver when the body temperature drops below a certain first threshold or exceeds a certain second threshold. The skilled person will appreciate that other or additional medical sensors may be integrated in further embodiments of the care and security luminaire, further enhancing the luminaire's contribution to the safety and security of the elderly person without intruding his privacy.

In embodiments of the elderly care and security system according to claim 10, the lighting luminaire further comprises an interface to one or more external medical sensor.

Thus, apart from or in addition to medical sensors integrated in the care and security luminaire, one or several interfaces may be provided for connectivity with external medical sensors, for example sensors that have to make contact with the elderly person's body in order to measure certain medical parameters.

In embodiments of the elderly care and security system according to claim 11, the one or more external medical sensor comprise:
  a body temperature sensor;
  a blood pressure sensor; and/or
  a blood oxygen saturation sensor.

The body temperature sensor for instance is attached to the elderly person's skin. The blood oxygen saturation sensor may slide over the elderly person's finger to measure the oxygen concentration in the elderly person's blood. The body temperature and/or the blood oxygen concentration measured by these sensors may be communicated wirelessly to the care and security luminaire which may adapt the light colour in case of worrying parameter values or may send notifications to caregivers or relatives of the elderly person in case of worrying parameter values.

In embodiments of the elderly care and security system according to the present invention, as defined by claim 12, the lighting luminaire further comprises an RFID reader configured to perform at least one of:
  detection of a token carried by the elderly person;
  detection of a token carried by a caregiver of the elderly person;
  detection of a material; and/or
  detection of a device.

An RFID reader configured to sense a token carried by the elderly person may enable the elderly person to deactivate an audible or visible alarm. An RFID reader configured to sense a token carried by a caregiver enables to detect the presence of person in the room that can assist the elderly person in case of an alarming situation. Automated detection of the presence of a caregiver in the room is advantageous as it enables the care and security luminaire to decide if an alarm must be activated or send, if an alarm must be repeated, etc. An RFID reader configured to detect material brings the advantage that the state of material may be established automatically, for instance the fill level of incontinence material worn by the elderly person. This way, automated alarms may be triggered for replacing material. An RFID reader configured to detect a device like for instance a cart, wheelchair, rollator, tilt lift, etc. enables to monitor and track the location of such devices in the house, service flat or care institution where the elderly person resides.

In embodiments of the elderly care and security system according to the invention, as defined by claim 13, the lighting luminaire further comprises a device stimulating the elderly person to perform at least one of:
- a therapy;
- drinking water;
- taking medication: and/or
- airing said room.

Indeed, the loudspeaker, lighting unit, or wireless transceiver in the care and security luminaire may be configured or controlled to inform the elderly person through audible or visible messages that medication must be taken or alternative therapy must be followed at the appropriate times, that the elderly person must drink water in case the temperature in the room stays above a certain threshold for a certain time, that the room must be aired when conditions in the room require so, etc. The care and security luminaire that way increases the elderly person's therapy loyalty, and assists the elderly person in taking the necessary measures to avoid unhealthy or unsafe conditions in the room.

In embodiments of the elderly care and security system according to the invention, as defined by claim 14, the lighting luminaire further comprises a light remote control module with wireless connectivity or powerline connectivity to a light switch in the room, the light remote control module being configured to switch off emission of light by the lighting unit without depowering the lighting luminaire upon receipt of a signal from the light switch.

Indeed, whereas a traditional lamp or luminaire is depowered by a switch in the room, that same switch may no longer depower the care and security luminaire according to the invention replacing the traditional lamp or luminaire. The switch may still be used to turn on/off the lighting, but when the lighting is turned off, all other functionality provided by the sensors integrated in the care and security luminaire must continue to work and therefore may not be depowered. This can be realised by a light remote control module in the luminaire that is connected to the switch in the room and that is configured to switch off the light emission in return to a signal from the switch without depowering the luminaire such that all other care and security functions of the luminaire continue to work.

BRIEF DESCRIPTION OF THE DRAWINGS

FIG. 1 is a block scheme of an embodiment of the elderly care and security system according to the present invention.

DETAILED DESCRIPTION OF EMBODIMENT(S)

FIG. 1 shows a care and security luminaire 100 connected to an available power supply 150 in the room of an elderly person. The care and security luminaire 100 comprises thermography sensors, FIR (Far Infrared) or 101, colour sensors, RGB (Red Green Blue) or 102, and infrared sensors, IR or 103. The care and security luminaire 100 further comprises a number of environmental sensors including a smoke/fire sensor 104, an ambient light sensor 105, a VOC (Volatile Organic Compounds) sensor 106 and a CO (carbon monoxide) sensor 107. The care and security luminaire 100 in addition to the sensors 101-107 comprises a LED lamp 110, an amplifier 121 and loudspeaker 122, microphones 131-132, a WiFi transceiver 140 with antenna 141, a 4G wireless transceiver 150 with antenna 151, a light remote control module 160 with antenna 161, and an RFID reader 170. The sensors 101-107, LED lamp 110, amplifier 121, microphones 131-132, WiFi transceiver 140, 4G wireless transceiver 150, light remote control module 160 and RFID reader 170 are all coupled with a processor 180 integrated in the care and security luminaire 100. The latter luminaire 100 further also comprises a power management module 190.

The output signals of the thermography sensors 101, RGB sensors 102 and IR sensors 103 are processed by processor 180 to detect presence/absence of persons in the room and to detect movements of persons present in the room. The processor 180 shall apply a fall detection algorithm to detect a fall of the elderly person living in the room that is monitored by the luminaire 100. When a fall is detected, the voice/speech module 181 in processor 180 shall activate the amplifier 121, loudspeaker 122 and one or several microphones 131-132 to request confirmation from the elderly person that he is fallen. Through voice recognition and speech processing in module 181 the processor 180 obtains confirmation of the fall. As soon as confirmation of the fall has been received or in case of absence of any reaction at all from the elderly person, the alerting module 183 in processor 180 activates the 4G transceiver 150 and/or the WiFi transceiver 140 to transmit a message to a relative or caregiver of the elderly person informing the latter of the fall of the elderly person. In case the elderly person denies that he was fallen, the processor 180 will take no action and assume that a false positive detection took place.

The output signals of the thermography sensors 101, RGB sensors 102 and IR sensors 103 are further processed by processor 180 to detect that the elderly person living in the monitored room is lying in bed. When this is the case, the output signals of the thermography sensors 101, RGB sensors 102 and IR sensors 103 are processed by processor 180 to detect presence of another person in the monitored room or in a different room of the elderly person's home if plural luminaires 100 are installed in different rooms and network connected. When presence of another person is detected while the elderly person is lying in bed, the lock/unlock module 184 in processor 180 shall activate the WiFi transceiver 140 to transmit a control message to one or several electrical locks in the elderly person's home in order to create a safe room for the elderly person. In addition, the voice/speech module 181 in processor 180 shall activate the amplifier 121, loudspeaker 122 and one or several microphones 131-132 in order to verify the elderly person is safe. Through voice recognition and speech processing by module 181, the processor 180 attempts to obtain an identification and/or security code from the entering person. In absence of any identification or in the situation where the elderly person denies he is safe, the alerting module 183 in processor 180 activates the 4G transceiver 150 and/or the WiFi transceiver 140 to transmit a message to a relative or caregiver of the elderly person, informing the relative or caregiver of assumed illegal intrusion in the elderly person's home.

The output signals of the thermography sensors 101, RGB sensors 102 and IR sensors 103 are further processed by processor 180 to detect that the elderly person living in the monitored room is absent from his room or absent from his home in case plural luminaires 100 are installed in plural rooms of the elderly person's home and network connected. If the elderly person is absent for at least a certain, predetermined amount of time, for example 15 minutes, the processor 180 assumes that the elderly person has left his home. The alarm module 185 in processor 180 shall then activate the 4G transceiver 150 and/or WiFi transceiver 140 to transmit a control message to an alarm monitoring system to activate the latter alarm monitoring system automatically. This way, the elderly person's home is protected against burglary or illegal intrusion each time the elderly person leaves his home and forgets to activate his alarm monitoring system. When the elderly person enters again, the care and security luminaire requests the elderly person to identify himself/herself and/or to enter a secure code in order to deactivate the alarm system.

The output signals of the environmental sensors 104-107 are processed by the processor 180 in order to detect situations that are unsafe or unhealthy for the elderly person. In case smoke or fire is detected based on the output signal of smoke/fire sensor 104, the alerting module 183 in processor 180 shall activate the amplifier 121 and loudspeaker 122 to issue a warning tone or signal urging the elderly person to leave the room or home. In addition, the lock/unlock module 184 in processor 180 shall activate the WiFi transceiver 140 to unlock one or plural electrical locks on doors/windows in the elderly person's room or home in order to guarantee a safe exit for the elderly person.

The output signal of the ambient light sensor 105 is used to know whether or not IR emitting LEDs need to be turned on to illuminate the room. The IR light is invisible light to the user but picked up by one of the sensors. It is turned off again when there is sufficient visible light in order to save power. The output signal of the ambient light sensor 105 is further processed to enable the lighting control module 182 in processor 180 to control the light emitted by LED lamp 110 in view of the ambient light. The light intensity and/or colour of the light emitted by LED lamp 110 may for instance be controlled to compensate for variations in the ambient light throughout the day, resulting for instance from varying daytime/night time, varying weather conditions, etc.

The output signals of VOC sensor 106 are processed for example to detect if the CO2 concentration in the room where the elderly person lives, stays below a certain, predetermined threshold. When the threshold is exceeded, the alerting module 183 in processor 180 shall activate the amplifier 121 and speaker 122 to issue a message advising the elderly person to vent or air his room by activating the ventilation or opening a window. The lighting control module 182 in processor 180 may in addition control the colour of the light emitted by LED lamp 110 to become greenish, further indicating to the elderly person that it is advised to vent or air the room.

The output signals of CO sensor 107 are processed to detect if the CO concentration in the room where the elderly person lives, stays below a certain, predetermined threshold. When the threshold is exceeded, for instance as a result of malfunctioning of a heating device, the elderly person is at risk. The alerting module 183 in processor 180 therefore shall activate the amplifier 121 and loudspeaker 122 to generate a tone or signal urging the elderly person to leave the room. In addition, the lock/unlock module 184 in processor 180 shall activate the WiFi transceiver 140 to transmit control messages to unlock one or plural electrical locks on doors or windows in the elderly person's room or home in order to guarantee a safe exit for the elderly person.

The processor 180 further permanently processes the sound captured by an always-on microphone, for instance microphone 131, to detect in the sound spectrum frequencies that are correlated with glass break. If such frequencies are detected in the sound spectrum, the lock/unlock module 184 in processor 180 activates the WiFi transceiver 140 to transmit control messages to one or several electrical locks of windows or doors in the elderly person's home in order to create a safe room for the elderly person. In addition, the voice/speech module 181 in processor 180 activates the amplifier 121, loudspeaker 122 and one or plural microphones 131-132 to obtain confirmation from the elderly person that he is safe. In absence of confirmation or in the event the elderly person denies being safe, the alerting module 183 in processor 180 shall activate the 4G transceiver 150 or Wifi transceiver 140 to transmit an alert to a relative of caregiver of the elderly person, informing the relative or caregiver of assumed glass break in the room or home of the elderly person.

In variant embodiments of the luminaire 100, the processor 180 may be configured to control the colour of light emitted by the LED lamp 110 in view of certain events. These events may be detected via the sensors 101-107. For instance, when the CO2 concentration in the air is sensed to exceed a certain threshold, the light emitted by LED lamp 110 may be controlled to turn greenish to advise the elderly person to open a window or activate the ventilation system in his room. Other events may be programmed, like for instance times whereon the elderly patient has to take medication. At such times, the light emitted by the LED lamp 110 may be controlled to turn blueish to indicate to the elderly person that medication must be taken.

Embodiments of the luminaire 100 may be equipped with self-learning technology, for instance a neural network 186, configured to learn behaviour of the elderly person, like for instance the typical step rate, acceleration, body position, typical sequence of actions or movements, etc. Any deviation from the learned behaviour that exceeds certain thresholds, may be exploited by the luminaire 100 to either interrogate the elderly person and obtain confirmation on his safe-being, alert a relative or caregiver, control the lighting, and/or control electrical locks in the elderly person's home.

Whereas the luminaire 100 comprises a number of environmental sensors 104-107, the skilled person will appreciate that other or additional environmental sensors may be integrated in variant embodiments of the luminaire 100. As an example, a humidity sensor may be integrated in a variant embodiment of the luminaire enabling to sense the humidity in the room or home of the elderly person. The output of such sensors may for instance be used to further control the colour of the light emitted by the LED lamp, and turn it for instance reddish in case of a high humidity in order to advise the elderly person to drink water at regular times.

In addition to environmental sensors, variant embodiments of the luminaire 100 also may comprise medical sensors, like for instance a heartrate sensor, a breath rate sensor, etc. In the example of FIG. 1, the output of the FIR sensors 101, RGB sensors 102 and IR sensors may even be processed to monitor the heartrate and/or breath rate of the elderly person, for instance while asleep in bed, without the need for additional sensors. Again the processor 180 may use the output of medical sensors integrated in the luminaire 100 to control the colour and/or brightness of the light emitted by the LED lamp 110, to interrogate the elderly person using the amplifier 121, loudspeaker 122 and microphone(s) 131-132, to alert a relative or caregiver via the wireless interfaces 141 or 151 and/or to control the locking/unlocking of doors in the elderly person's home for safety reasons.

Variant embodiments of the luminaire 100 also may be equipped with wireless interfaces, for instance a Bluetooth interface, that provide connectivity to external sensors such as for instance a body temperature sensor attached to or carried by the elderly person, a blood pressure sensor, a blood oxygen sensor attached to a finger of the elderly person, etc. Such interface allows to collect signals from various sensors not integrated in the luminaire, that may be used by the processor 180 to further adapt the colour and/or brightness of the light emitted by the LED lamp, to interrogate the elderly person on a worrying situation, to alert a relative or caregiver, and/or to lock/unlock doors to establish safety for the elderly person.

The luminaire 100 illustrated by FIG. 1 further comprises an RFID reader 170, configured to detect RFID tokens. Such RFID token may for instance be worn by the elderly person in order to identify the elderly person towards the luminaire 100. An RFID token also may be carried by a caregiver or relative of the elderly person that is granted access to the elderly person's room or home, in order to identify such caregiver or relative towards the luminaire 100. The RFID reader 170 obviously may also sense other RFID tokens that are for instance used to label material or devices like a wheelchair, a walker, medical devices, etc. In particular when installed in the rooms of a care institution, the networked care and security luminaires equipped with an RFID reader may assist elderly persons and personnel to locate devices in the building.

An important component of the luminaire 100 is the light remote control module 160 with wireless antenna 161. The wireless antenna 161 may for instance be an EnOcean 868 Mhz antenna that receives signals from an EnOcean module that is installed behind and connected to each switch in the elderly person's room or home that will be used to switch on/off the LED lamp 110. Traditionally, such switch interrupts the power supply 150 to switch off the lighting. The EnOcean module installed behind such switch shall avoid interrupting the power supply 150. In case the switch is used to turn off the lighting of the LED lamp, the EnOcean module installed behind the switch informs the light remote control module 160 which in turn instructs the processor 180 to switch off the light emitted by LED lamp 110. The power supply 150 will not be interrupted as a result of which all other functionality provided by the luminaire 100 remains powered in periods where the lighting is switched off.

The power management module 190 that forms part of the care and security luminaire 100 illustrated by FIG. 1 converts the available electrical power, for instance 220 Volt 50 Hz AC, to the power levels and frequencies required by the various components of the luminaire 100, for instance 6 Volt DC, 12 Volt DC, etc.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An elderly care and security system comprising one or more networked lighting luminaire, said lighting luminaire being designed to be mounted in a room of an elderly person's home at a spot on a ceiling or wall where electric power is available, said lighting luminaire comprising:
   (A) one or more sensors configured to:
      (A1) reliably detect a fall of said elderly person and to generate first signaling in return to detection of said fall;
      (A2) detect smoke in said room and to generate second signaling in return to detection of said smoke;
      (A3) detect glass break in said room and to generate third signaling in return to detection of said glass break;
      (A4) detect presence of another person in said room while said elderly person is lying in bed, and to generate fourth signaling in return to detection of said presence of another person; and
      (A5) detect presence of a person while an alarm system is active after detecting no presence for a period longer than a predetermined time interval, and to generate fifth signaling in return to detection of said presence of a person while said alarm system is active;
   (B) a lighting unit controlled to adaptively illuminate said room based on said first, second, third, fourth or fifth signaling;
   (C) a wireless bi-directional transceiver, loudspeaker and microphone, configured to be activated automatically for voice communication with said elderly person, a caregiver or relative of said elderly person in return to said first, fourth or fifth signaling;
   (D) a door locking/unlocking unit with connectivity to an electrical door lock, said door locking/unlocking unit being configured to automatically unlock a door in return to said second signaling and to automatically lock a door of a safe room for said elderly person in return to said third signaling and/or said fourth signaling; and
   (E) an alarm activating unit with connectivity to said alarm system, said alarm activating unit being configured to automatically activate said alarm system after detecting no presence for a period longer than said predetermined time interval, and to automatically deactivate said alarm system in return to said fifth signaling and valid identification of said person.

2. The elderly care and security system according to claim 1, wherein said one or more sensor comprise at least one of:
   a thermography sensor;
   a time-of-flight sensor;
   an RGB sensor;
   a 3D RGB sensor;
   a smoke chamber;
   an infrared sensor;

a radar; and/or a lidar.

3. The elderly care and security system according to claim 1, further comprising:

a processor whereto said one or more sensors are coupled, said processor being configured to detect an event based at least on said first, second, third, fourth and/or fifth signaling, and further being configured to control said lighting unit to adapt the color of emitted light in view of said event.

4. The elderly care and security system according to claim 1 wherein said lighting unit is controlled to generate bio-rhythmic light.

5. The elderly care and security system according to claim 1, further comprising a neural network configured to learn a behavioral pattern of said elderly person, said wireless bi-directional transceiver further being configured to automatically send a message to a caregiver or relative of said elderly person in return to detection of behavior of said elderly person that deviates for more than a predetermined level from said behavioral pattern.

6. The elderly care and security system according to claim 1 wherein said lighting luminaire further comprises one or more environmental sensors.

7. The elderly care and security system according to claim 6, wherein said one or more environmental sensors comprise:

a humidity sensor;

a $CO_2$ sensor;

a VOC sensor;

a CO sensor.

8. The elderly care and security system according to claim 1 wherein said lighting luminaire further comprises one or more medical sensor.

9. The elderly care and security system according to claim 8, wherein said one or more medical sensor comprise:

a heartrate sensor;

a breath rate sensor.

10. The elderly care and security system according to claim 1 wherein said lighting luminaire further comprises an interface to one or more external medical sensor.

11. The elderly care and security system according to claim 10, wherein said one or more external medical sensor comprise:

a body temperature sensor;

a blood pressure sensor;

a blood oxygen saturation sensor.

12. The elderly care and security system according to claim 1 wherein said lighting luminaire further comprises an RFID reader configured to perform at least one of:

detection of a token carried by said elderly person;

detection of a token carried by a caregiver of said elderly person;

detection of a material; and/or detection of a device.

13. The elderly care and security system according to claim 1 wherein said lighting luminaire further comprises a device stimulating said elderly person to perform at least one of:

a therapy;

drinking water;

taking medication: and/or airing said room.

14. The elderly care and security system according to claim 1 wherein said lighting luminaire further comprises a light remote-control module with wireless connectivity or powerline connectivity to a light switch in said room, said light remote control module being configured to switch off emission of light by said lighting unit without depowering said lighting luminaire upon receipt of a signal from said light switch.

* * * * *